ated with use in a wireless radio frequency communications channel. This modem provides a data carrier detection (DCD) function for associated data terminal equipment even though a transmission carrier or tone is not used. Provision is also made for communicating with data terminal equipment operating at a substantially lower data rate than the modem data rate without requiring a reduction in the modem data rate.

United States Patent [19]
Nelson et al.

[11] Patent Number: 4,852,122
[45] Date of Patent: Jul. 25, 1989

[54] MODEM SUITED FOR WIRELESS COMMUNICATION CHANNEL USE

[75] Inventors: David P. Nelson; Joseph L. Harris, both of Huntsville; Charles E. Polk, Jr., Harvest, all of Ala.

[73] Assignee: Universal Data Systems, Inc., Huntsville, Ala.

[21] Appl. No.: 91,615

[22] Filed: Aug. 31, 1987

[51] Int. Cl.⁴ .......................................... H04L 5/16
[52] U.S. Cl. ..................................... 375/8; 375/121; 340/825.62
[58] Field of Search ......................... 375/7, 8, 36, 121; 370/85; 379/96, 97; 340/825.14, 825.62

[56] References Cited

U.S. PATENT DOCUMENTS

| | | | |
|---|---|---|---|
| 4,044,307 | 8/1977 | Borysiewicz et al. | 375/8 |
| 4,387,440 | 6/1983 | Eaton | 375/8 |
| 4,446,564 | 5/1984 | Pierce | 375/8 |
| 4,484,327 | 11/1984 | Hanson | 370/102 |
| 4,549,302 | 10/1985 | Heatherington | 375/5 |
| 4,567,603 | 1/1986 | Howell et al. | 375/65 |
| 4,622,685 | 11/1986 | Dhawan et al. | 375/121 |
| 4,665,519 | 5/1987 | Kirchner et al. | 375/8 |
| 4,715,044 | 12/1987 | Gartner | 379/97 |

FOREIGN PATENT DOCUMENTS 0197541  8/1986  European Pat. Off. ................ 375/8

OTHER PUBLICATIONS

Quresch et al. "A Custom VLSi Chip Set for Digital Signal Processing in High-Speed Voiceband Modems" IEEE Journal on Selected Area in Communications, vol. SAC-4, No. 1, Jan. 1986.
C. Mills "A New Approach to Modem Design" Communication & Broadcast (GB) vol. 4, No. 2, (Spring, 1978).
Gilhousen "A Multi-Stack Microprocessor for Satellite Modems" NTC Telecommunication Conference, San Diego, Calif. 19174.

Primary Examiner—Benedict V. Safourek
Assistant Examiner—Stephen Chin
Attorney, Agent, or Firm—Charles L. Warren

[57] ABSTRACT

The modem of this invention overcomes problems associated with use in a wireless radio frequency communications channel. This modem provides a data carrier detection (DCD) function for associated data terminal equipment even though a transmission carrier or tone is not used. Provision is also made for communicating with data terminal equipment operating at a substantially lower data rate than the modem data rate without requiring a reduction in the modem data rate.

17 Claims, 3 Drawing Sheets

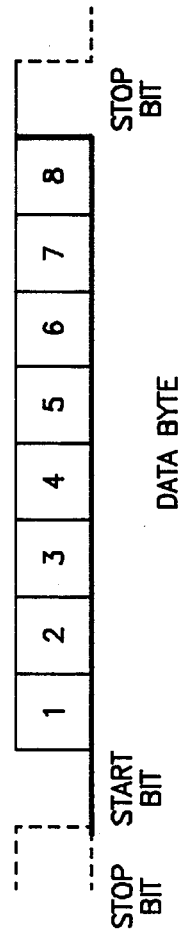
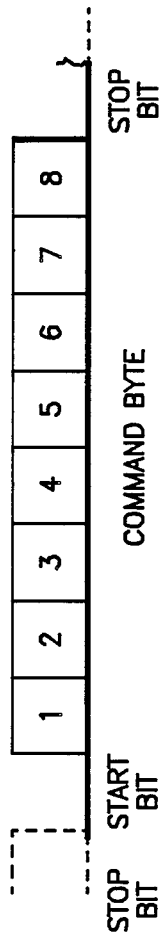

MODEM SUITED FOR WIRELESS COMMUNICATION CHANNEL USE

BACKGROUND OF THE INVENTION

This invention relates to a modem and a modem signalling protocol especially suited for use with wireless communication equipment. A described method of modulation of digital data is especially suited for use with conventional two-way FM radios.

The transmission of digital data over a radio link has been accomplished by the use of 202 modems which provide direct audio frequency shift keying (FSK) to the normal audio input of a two-way radio. The use of 202 modems in such a system requires no special signalling protocol considerations since the substitution of radios for the normal wireline communication channel does not disrupt the normal tone signalling.

SUMMARY OF THE INVENTION

It is an object of the present invention to provide a modem signalling protocol compatible with the needs of conventional data terminal equipment (DTE) where baseband modulation of conventional two-way radios is used.

Another object of this invention is to provide a modem with an improved communication protocol which allows DTE with different data rates to communicate with each other.

An embodiment of a modem according to the present invention communicates digital data with DTE, demodulates signals received from a two-way radio to recover the digital data, and provides a baseband modulation signal to the two-way radio which carries the digital data to be transmitted. The modem overcomes the lack of a communication channel carrier for data carrier detection (DCD). There is generated and transmitted by the radio a first digital command word representing DCD true prior to the transmission of the digital data. A second digital command word is generated and transmitted representing DCD false at the end of the transmission of the digital data. A DCD signal is provided to the DTE controlled according to the first and second digital command words. The modem also provides control of the two-way radio transmitter in response to a request to send (RTS) signal by the DTE.

The modem also accommodates digital data from a DTE at a lower rate than the predetermined constant data rate of the modem. This allows higher speed DTE's to make use of the higher modem rate without requiring the modem rate be adjusted to the slowest data rate encountered. A buffer stores the digital data from a DTE running at a slower rate. The modem transmits the stored digital data at the higher predetermined data rate of the modem, and also transmits predetermined filler data between the transmission of the stored digital data in order to maintain a constant transmission rate over the modem.

BRIEF DESCRIPTION OF THE DRAWINGS

FIGS. 4 and 5 illustrate a digital format utilized for data bytes and command bytes, respectively.

FIG. 6 illustrates the digital signalling protocol utilized to transmit a data carrier detection (DCD) true command.

FIG. 7 illustrates the digital protocol utilized to send a DCD false command.

DETAILED DESCRIPTION

Figure 1:
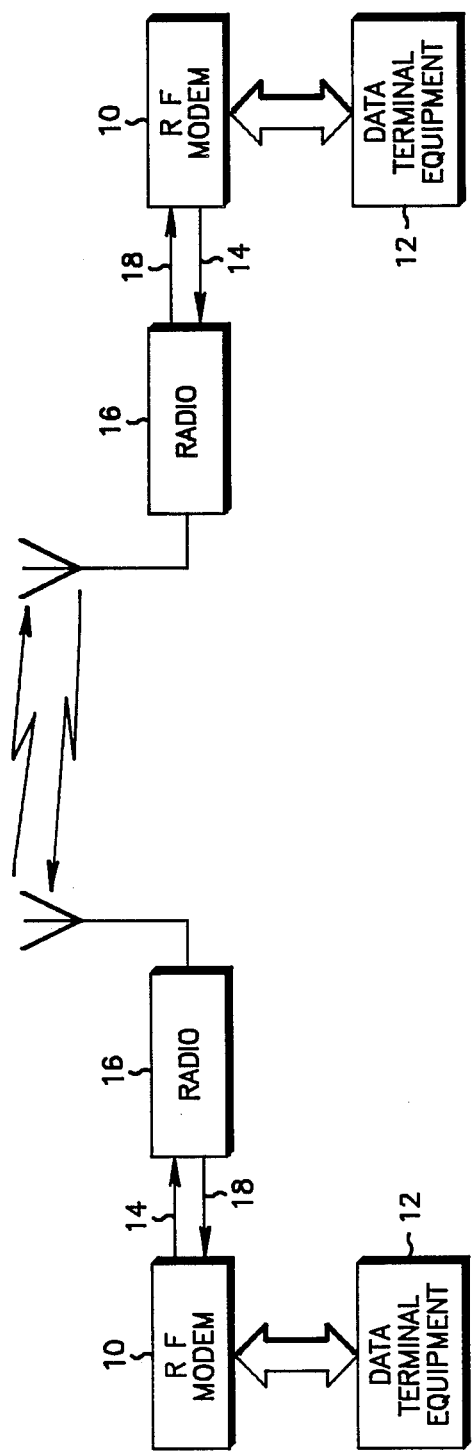
FIG. 1 illustrates a wireless two-way communication system according to the present invention.

FIG. 1 illustrates a wireless communication system utilizing RF modems 10 according to the present invention. The modems communicate digital data with data terminal equipment (DTE) 12, provide appropriate modulating signals 14 to conventional two-way FM radios 16, and decode signals 18 received by the radios. If full duplex radios 16 are utilized, data transmission is simultaneously permitted in both directions. If only half duplex radios are used, then only half duplex data transmission is available. The DTE represents any type of digital equipment which transmits or receives digital data. In one application of the present invention, digital information from a portable optical bar code reader is transmitted via two-way radio to a central computer which maintains inventory and pricing information of a variety of products such as might be found in a department store.

Figure 2:
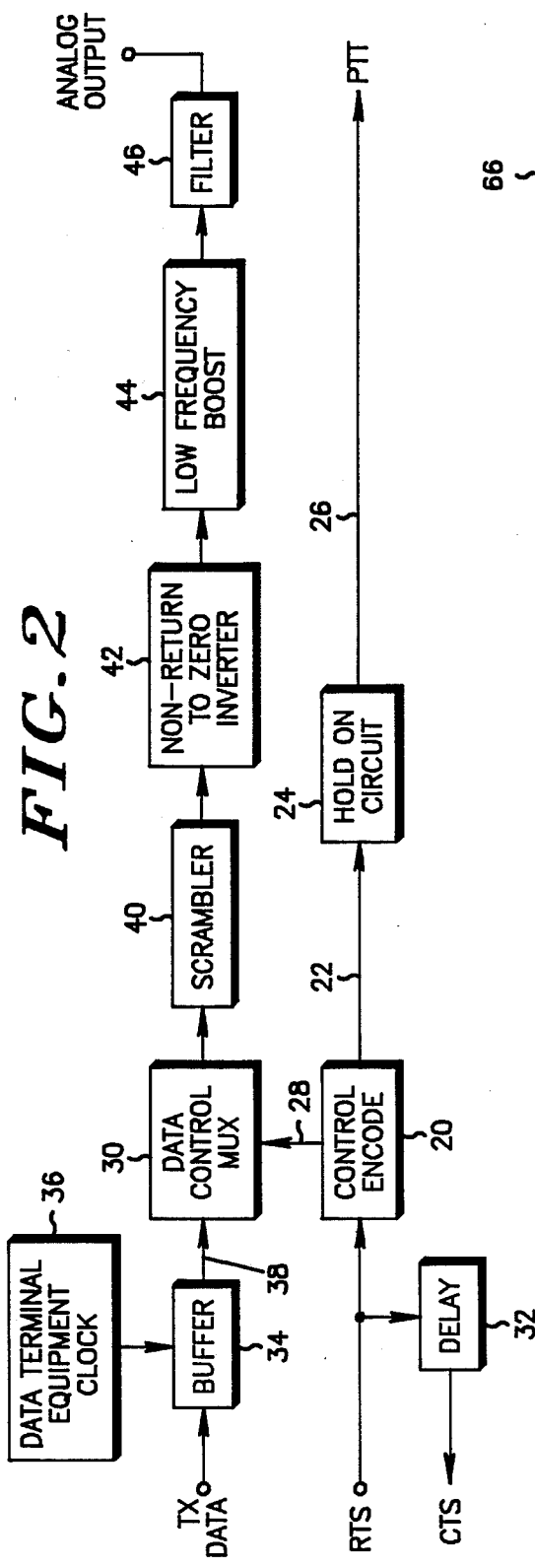
FIGS. 2 and 3 are block diagrams illustrating respectively the transmitter and receiver portions of an embodiment of a modem according to the present invention.

In FIG. 2, the transmitter or modulation portion of the RF modem 10 is shown. Digital data to be transmitted and a request to send (RTS) signal are received from the DTE and clear to send (CTS) is provided to the DTE. Upon receiving an RTS signal, control encode 20 provides an output signal 22 to hold-on circuit 24 which immediately provides a true signal 26 which is connected t the push to talk (PTT) input of the radio 10. The PTT turns on the transmitter in radio 10 in preparation for data transmission. Hold-on circuit 24 may comprise a conventional type of fast attack slow drop-out time delay circuit. This will provide the desired fast turn on of the transmitter with a delayed turn off to provide time for the end of data transmissions. Control encode 20 also provides a digital protocol sequence on line 28 which will be described with regard to FIG. 6. Control encode 20 may consist of conventional hardware logic or may be implemented in software in accordance with the parameters described below. After a delay determined by delay circuit 32, CTS is provided to the DTE in response to the RTS request. This delay prohibits the DTE from beginning data transmission until the communication channel has been established.

The DTE data is received by buffer 34 which may comprise a shift register and is transmitted by line 38 to data control multiplexer 30 pursuant to a clock input provided by DTE clock 36. The DTE clock rate is set at the data rate of the DTE. The output of multiplexer 30 is received by a conventional data scrambler 40 which provides randomization of the transmitted bits to insure a minimum of low frequency components in the signal spectrum. Such a scrambler may comprise a conventional shift register with feedback. The output of the scrambler is further processed by a non return to zero inverting (NRZI) encoder 42 which provides a data stream which is not polarity sensitive. That is, an inversion of the data stream between the output of the modem transmitter and the receiving modem will not prevent recovery of the original digital data by the receiver modem. NRZI coding rules and implementation of NRZI coding are known.

Low frequency boost circuit 44 provides additional amplification of low frequency portions of the data spectrum received from NRZI encoder 42 in order to compensate for the possible lack of sufficient low frequency response by a conventional FM radio. The low frequency response of the radio transmitter must extend to approximately 0.001 times the baud rate assuming an 8 bit scrambler is used. The output of boost circuit 44 is filtered by filter 46 before being passed as an analog baseband output to the FM radio. The purpose of the filter is to shape the spectral response of the data to ensure compliance with restrictions on transmitted frequency spectrum. The low frequency boost circuit 44 may comprise a low pass filter and the filter 46 a bandpass filter.

The RF modem according to the present invention provides direct baseband modulation(varying DC levels) to the FM radio. This modulation is applied to a direct input to the FM radio modulator which is available in conventional FM radios. For example, Motorola two-way FM portable radios commonly provide an input referred to as the "PL" or "DPL" which effectively couples a modulating signal through a capacitor to the transmitter's modulator. The use of this modulation technique produces direct frequency modulation about the center frequency of the two-way radio. Since no audio tones or signal carriers are used, there is no means for conventional DCD recognition based upon such carriers. The present invention provides an alternative means for providing DCD control which is explained below.

Figure 3:
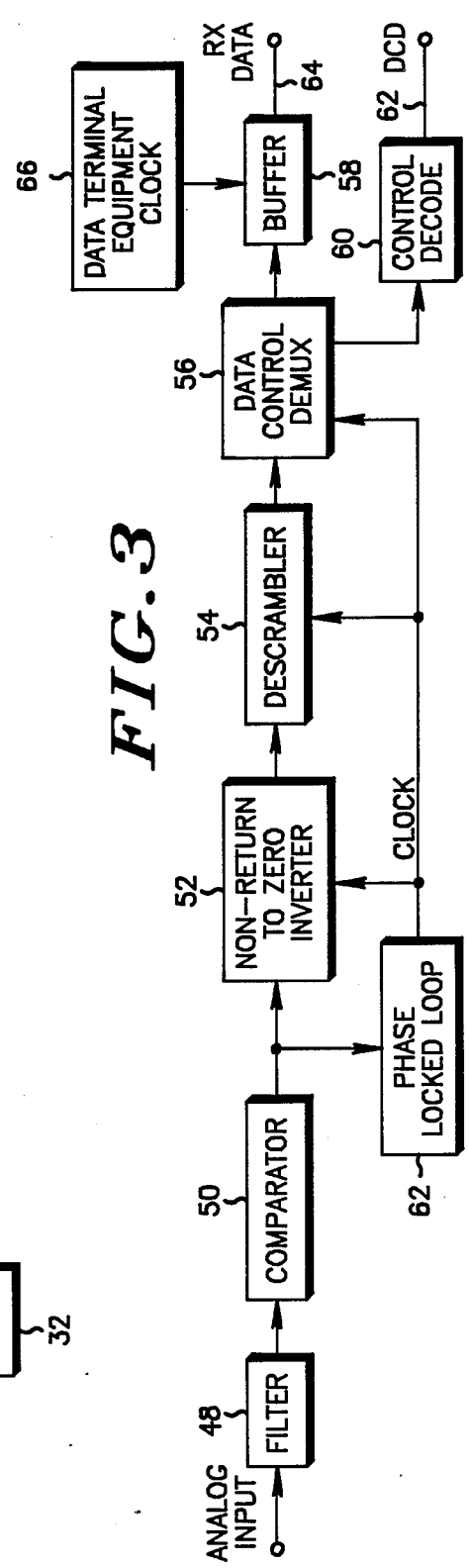

FIG. 3 illustrates the receiver or demodulating portion of the RF modem 10 in which bandpass filter 48 receives an analog input signal from the FM radio, preferably from the discriminator output of the radio. The filtered data provides an input to comparator 50 which provides output logic 1 and 0 levels to NRZI decoder 52. This decoder is the functional complement of the NRZI encoder 42 in the modem transmitter and provides non return to zero data output. NRZI encoder 42 and decoder 52 cooperate to eliminate a potential data recovery problem which would occur if an unanticipated polarity inversion resulted due to the particular FM radios utilized. The output of the decoder is acted upon by descrambler 54 which performs the inverse function of scrambler 40 in order to reconstitute and recover the original data. The received data is an input to data control demultiplexer 56 which routes data bytes to buffer 58 and nondata bytes including command and filler bytes (discussed below) to control decode 60. The demultiplexer 56 may consist of conventional logic gates or may be implemented in software to provide the function according to protocol as described below. A phase locked loop 62 receives the filtered data output from comparator 50 and provides a clock output to elements 52, 54 and 56.

Control decode 60 functions to recognize predetermined command bytes and provide functional outputs corresponding to the function corresponding to each command byte. The exemplary command byte represents the DCD command which provides a DCD true signal on output line 62 to the receiving DTE. The data bytes stored in buffer 58 which may consist of a shift register or memory allocation are transmitted to the receiving DTE on the RX data line 64 at the receiving DTE rate as determined by DTE clock 66.

The total channel response time as measured from the output of NRZI encoder 42 in the modem transmitter to the input to comparator 50 in the modem receiver should be equal to or less than the number of bits per baud divided by the bit rate. Preferably, this time response is dominated by the characteristics of filters 46 and 48. Filter 46 has an additional constraint in that it must provide sufficient filtering to meet controlled emission standards. For example, a modem data rate of 4800 bits per second and a 1 bit per baud format would require a response time of approximately 208.3 microseconds.

The protocol used with the RF modems according to the present invention includes DCD information and allows different DTE to communicate predetermined length messages at different data rates. The protocol contemplates asynchronous modem data.

FIGS. 4 and 5 illustrate the data and command byte formats, respectively Each data byte is defined by a start bit—0, eight data bits, and a stop bit—1. Each command byte is defined by a start bit—0, eight bits, and a stop bit—0. The eight available bits in the command byte provides for 256 possible system commands. In the illustrated system, only three commands are defined: DCD true, DCD false and a stuff (filler) byte. It will be apparent that command bytes are defined by a 0 stop bit.

Referring to FIG. 6, a three byte pattern generated by control encode 20 is repeated for the time interval defined by delay circuit 32 which corresponds to the delay between RTS and CTS. The three byte pattern consists of character one, character two, and FF(H) (FF in hexidecimal). Control decode 60 in the RF modem receiver provides a DCD true output on line 62 to the receiving DTE following detection of the three byte sequence and detection of the first stuff byte. A stuff byte is a command byte which has no corresponding command function. It is used as filler information which is utilized to permit different DTE data rates as will be explained below. A stuff byte is generated at the end of the three byte pattern following CTS changing from false to true.

In FIG. 7, it will be seen that two end of data (DCD false) command bytes are sent at the end of data transmission in order to ensure that control decode 60 recognizes the command and turns DCD line 62 from true to false. The two end of data command bytes are separated by an FF(H) byte to enhance character synchronization and hence maximize the probability that the second end of data command byte will be correctly recognized. The origination of the end of data byte by control encode 20 in response to RTS changing from true to false releases hold-on circuit 24 allowing the two-way radio transmitter control by PTT to be turned off after a delay associated with hold-on circuit 24. This delay is sufficient to allow completion of the end of data sequence before the transmitter turns off.

The RF modems are capable of operating in a system with DTE having different data rates. Stuff bytes are inserted in the transmitted data stream to fill idle time over the RF communications link in order to maintain clock and data synchronization. For example, this allows a DTE operating at 4800 bps to communicate with a DTE operating at 1200 bps over a modem communication channel operating at 4800 bps. If the faster DTE is the originating (transmitting) DTE, the received data will have to be stored at the receiving modem and sent to the slower DTE at its rate. This is accomplished by the buffer 58 in the RF modem receiver which operates under the control of the receiving DTE clock. The length of messages which can be communicated at a higher rate to the slower DTE is determined by the length of buffer 58. When the slower DTE sends data, the intervening time frames between data is filled with stuff bytes generated by control encode 20 to maintain clock and data synchronization. In the receiver of the RF modem, the data control demultiplexer 56 sends the data bytes to buffer 58 and sends the stuff bytes to control decode 60. Since the stuff bytes do not correspond with predetermined command bytes, the stuff bytes are ignored. This technique allows the RF modem and RF communications link to operate at the highest data rate available and yet accommodate communications with DTE having a slower or different data rates. In a system with different speed DTE, high speed DTE can communicate at lower throughput speeds with slower DTE while being able to communicate at full throughput speed with other high speed DTE.

Although an embodiment of the present invention has been described and illustrated in the drawings, the scope of the invention is defined by the claims appended hereto.

What is claimed is:

1. A modem that communicates digital data with data terminal equipment (DTE), demodulates signals received from a two-way radio to recover encoded digital data, and provides a modulation signal to said radio for encoding digital data received from said DTE, said modem comprising:

means for generating and transmitting via said radio first and second digital command words representing data carrier detection (DCD) true prior to the transmission of digital data received from said DTE and DCD false at the end of transmission of said DTE digital data, respectively;

means for providing a DCD true signal to said DTE on receiving said first digital signal and providing a DCD false signal to said DTE on receiving said second digital signal; and means for turning on the transmitter of said radio in response to a request to send (RTS) signal from said DTE and for turning off said transmitter after a predetermined delay following termination of said RTS signal.

2. The modem according to claim 1 further comprising means for generating a clear to send (CTS) signal following a predetermined delay after receiving a request to send (RTS) signal from said DTE.

3. The modem according to claim 1 further comprising means for coding said digital data before its transmission and decoding the received coded digital data such that an intervening polarity inversion between said coding and decoding does not prevent recovery of said digital data.

4. A modem that communicates digital data with data terminal equipment (DTE), demodulates signals received from a two-way radio to recover encoded digital data, and provides a modulation signal to said radio for encoding digital data received from said DTE, said modem comprising:

means for generating and transmitting via said radio first and second digital command words representing data carrier detection (DCD) true prior to the transmission of digital data received from said DTE and DCD false at the end of transmission of said DTE digital data, respectively;

means for providing a DCD true signal to said DTE on receiving said first digital signal and providing a DCD false signal to said DTE on receiving said second digital signal; said modem operating at a predetermined data rate and further comprising means for communicating with DTE operating at a data rate substantially slower than said predetermined data rate.

5. The modem according to claim 4 wherein said means for communicating comprises buffer means for storing digital data received from said DTE at said slower rate, means for transmitting said stored digital data at said predetermined data rate, and means for transmitting predetermined filler data between the transmission of said stored digital data in order to maintain the continuous transmission of data at said predetermined data rate.

6. The modem according to claim 5 wherein said means for communicating further comprises means for separating said filler data from received digital data such that only recovered digital data is provided to said DTE.

7. A modem that communicates digital data with data terminal equipment (DTE), demodulates signals received from a two-way radio to recover encoded digital data, and provides a modulation signal to said radio for encoding digital data received from said DTE, said modem comprising:

means for generating and transmitting via said radio first and second digital command words representing data carrier detection (DCD) true prior to the transmission of digital data received from said DTE and DCD false at the end of transmission of said DTE digital data, respectively;

means for providing a DCD true signal to said DTE on receiving said first digital signal and providing a DCD false signal to said DTE on receiving said second digital signal;

means for turning on the transmitter of said radio in response to a request to send (RTS) signal from said DTE and for turning off said transmitter after a predetermined delay following termination of said RTS signal, said modem operates at a predetermined data rate and further comprises means for communicating with DTE operating at a data rate substantially slower than said predetermined data rate;

means for scrambling data to be transmitted by said modem;

means for filtering said scrambled data in order to limit the frequency spectrum of a baseband analog output to said two-way radio; and means for increasing the amplitude of a low frequency portion of said scrambled data in order to compensate for low frequency response characteristic of said two-way radio.

8. A communication method for modems communicating over a wireless communication channel by means of two-way radios which do not utilize a transmitted carrier by which a conventional data carrier detection (DCD) indication can be derived, the method comprising the steps of:

generating and transmitting a first digital command word representing DCD true prior to the transmission of digital data;

generating and transmitting a second digital command word representing DCD false at the end of transmission of the digital data;

providing a DCD true signal on receiving the first digital signal and providing a DCD false signal upon receiving said second digital signal, thereby providing a DCD function without the presence of a conventional carrier; and turning on the transmitter of said two-way radio in response to a request to send (RTS) signal from data terminal equipment (DTE) connected with said modem and turning off said transmitter after a predetermined delay following termination of said RTS signal.

9. The method according to claim 8 further comprising the step of generating a clear to send signal following a predetermined delay after receiving a request to send signal from data terminal equipment connected with said modem.

10. The method according to claim 8 further comprising the steps of coding said digital data before its transmission and decoding the received coded digital data such that an intervening polarity inversion between said coding and decoding does not prevent recovery of said digital data.

11. A communication method for modems communicating over a wireless communication channel by means of two-way radios which do not utilize a transmitted carrier by which a conventional data carrier detection (DCD) indication can be derived, the method comprising the steps of:

generating and transmitting a first digital command word representing DCD true prior to the transmission of digital data;

generating and transmitting a second digital command word representing DCD false at the end of transmission of the digital data;

providing a DCD true signal on receiving the first digital signal and providing a DCD false signal upon receiving said second digital signal, thereby providing a DCD function without the presence of a conventional carrier;

turning on the transmitter of said two-way radio in response to a request to send (RTS) signal from data terminal equipment (DTE) connected with said modem and turning off said transmitter after a predetermined delay following termination of said RTS signal; and said modem operating at a predetermined data rate and storing digital data received from data terminal equipment (DTE) at a rate slower than said predetermined rate, transmitting said stored digital data at said predetermined data rate, and transmitting predetermined filler data between the transmission of said stored data in order to maintain a continuous transmission of data at said predetermined data rate.

12. The method according to claim 11 further comprising the step of separating said filler data from said received digital data such that only recovered digital data is provided to said DTE.

13. The method according to claim 11 further comprising the steps of coding said digital data before its transmission and decoding the received coded digital data such that an intervening polarity inversion between said coding and decoding does not prevent recovery of said digital data.

14. A wireless digital communication system comprising:

two-way radio that demodulates received signals corresponding to encoded digital data and transmits signals corresponding to digital data;

data terminal equipment (DTE) which generates and receives digital data; and modem, connected to said DTE and radio, provides a modulation signal to said radio for encoding digital data received from said DTE and decodes said demodulated received signals from said radio into digital data sent to said DTE, said modem including means for generating and transmitting via said radio first and second digital command words representing data carrier detection (DCD) true prior to the transmission of digital data received from said DTE and DCD false at the end of transmission of said DTE digital data, respectively, and means for providing a DCD true signal to said DTE on receiving said first digital signal and providing a DCD false signal to said DTE on receiving said second digital signal.

15. The system according to claim 14 wherein said modem operates at a predetermined data rate and includes means for communicating with said DTE operating at a data rate substantially slower than said predetermined data rate, said means for communicating comprising buffer means for storing digital data received from said DTE at said slower rate, means for transmitting said stored digital data at said predetermined data rate, and means for transmitting predetermined filler data between the transmission of said stored digital data in order to maintain the continuous transmission of data at said predetermined data rate.

16. The system according to claim 15 wherein said means for communicating further comprises means for separating said filler data from received digital data such that only recovered digital data ia provided to said DTE.

17. The system according to claim 14 further comprising means for coding said digital data before its transmission and decoding the received coded digital data such that an intervening polarity inversion between said coding and decoding does not prevent recovery of said digital data.

* * * * *